(12) United States Patent
Al Katheer et al.

(10) Patent No.: US 12,524,821 B2
(45) Date of Patent: Jan. 13, 2026

(54) METHOD AND SYSTEM FOR DETERMINING PREDICTED CONTRACT DATA USING MACHINE LEARNING

(71) Applicant: SAUDI ARABIAN OIL COMPANY, Dhahran (SA)

(72) Inventors: Omar A. Al Katheer, Inak (SA); Shooq S. Al Harbi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 335 days.

(21) Appl. No.: 18/450,309

(22) Filed: Aug. 15, 2023

(65) Prior Publication Data

US 2025/0061527 A1    Feb. 20, 2025

(51) Int. Cl.
| | |
|---|---|
| *G06Q 50/18* | (2012.01) |
| *G06N 3/084* | (2023.01) |
| *G06Q 30/08* | (2012.01) |
| *G06Q 50/02* | (2024.01) |

(52) U.S. Cl.
CPC ............ *G06Q 50/18* (2013.01); *G06N 3/084* (2013.01); *G06Q 30/08* (2013.01); *G06Q 50/02* (2013.01); *G06Q 2220/00* (2013.01)

(58) Field of Classification Search
None
See application file for complete search history.

(56) References Cited

U.S. PATENT DOCUMENTS

| | | |
|---|---|---|
| 11,164,152 B2 | 11/2021 | Al-Sinan et al. |
| 11,184,458 B1 | 11/2021 | Suckel |
| 11,514,511 B2 | 11/2022 | Al-Sinan et al. |
| 11,674,379 B2 | 6/2023 | Al Saad et al. |

(Continued)

FOREIGN PATENT DOCUMENTS

EP    2360630 A1 *   8/2011   ............. G06Q 10/06

OTHER PUBLICATIONS

Read, Gary, "How to Harvest the World's Largest Source of Data—Web Data," [online], available at: < https://www.dbta.com/Editorial/Trends-and-Applications/How-to-Harvest-the-Worlds-Largest-Source-of-Data-Web-Data-132105.aspx > (Year: 2019).*

(Continued)

*Primary Examiner* — Richard W. Crandall
(74) *Attorney, Agent, or Firm* — Osha Bergman Watanabe & Burton LLP

(57) ABSTRACT

A method may include obtaining historical contract data regarding various contracts for various service operations. The method may further include extracting, from various servers, supply data regarding various material components using a web scraping process. The method may further include identifying a contract among the contracts that is associated with a service operation. The method may further include determining predicted contract data for the contract using a machine-learning model, the supply data, and the historical contract data. The method further includes determining whether the predicted contract data satisfies a predetermined criterion. The method may further include determining, in response to the predicted contract data failing to satisfy the predetermined criterion, a contract adjustment based on the predicted contract data. The method may further include transmitting a command that adjusts the contract based on the contract adjustment.

20 Claims, 8 Drawing Sheets

(56) References Cited

U.S. PATENT DOCUMENTS

| | | | |
|---|---|---|---|
| 11,680,469 | B2 | 6/2023 | AlTammar et al. |
| 2020/0065922 | A1* | 2/2020 | Goldstraj ............... G06Q 50/18 |
| 2021/0304149 | A1* | 9/2021 | Al-Sinan ............ G06Q 10/0639 |
| 2022/0076174 | A1* | 3/2022 | AlAbdulkarim ....... G06Q 50/04 |
| 2022/0154574 | A1 | 5/2022 | Mehri |
| 2022/0172198 | A1 | 6/2022 | Gaur et al. |
| 2023/0003113 | A1 | 1/2023 | Alharbi et al. |
| 2023/0033150 | A1 | 2/2023 | Vilcinskas et al. |

OTHER PUBLICATIONS

DocuSign Contributor, "Contract AI: What It Is and What It Isn't"; Jun. 8, 2021; <https://www.docusign.com/blog/contract-ai#:~:text=Contract%20AI%20does%20not%20replace%20people&text=But%20unlike%20human%20review%20alone,Moreover%2C%20contract%20AI%20is%20verifiable>; Accessed Aug. 14, 2023 (7 pages).

Calvano, Emilio et al., "Artificial Intelligence, Algorithmic Pricing, and Collusion"; American Economic Review; vol. 110, Issue 10; pp. 3267-3297; Oct. 2020 (31 pages).

\* cited by examiner

METHOD AND SYSTEM FOR DETERMINING PREDICTED CONTRACT DATA USING MACHINE LEARNING

BACKGROUND

After execution of a contract, unforeseen circumstances may require changes to the contract. For example, contract changes may result from unexpected costs or the unavailability of necessary material components. Because contractors may seek different contract terms after winning a bid or executing a contract, changes to the contract need to be validated for accuracy (e.g., whether a price increase is actually required based on changing market conditions or a contract's request). Moreover, contract changes may also reduce the contract's initial value, thereby making it important to have accurate predictions of any costs associated with performance of the contract.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining historical contract data regarding various contracts for various service operations. The method further includes extracting, by a computer processor and from various servers, supply data regarding various material components using a web scraping process. The supply data includes chemical component price data, hot-rolled coil (HRC) steel data, and ocean freight data. The method further includes identifying, by the computer processor, a contract among the contracts that is associated with a service operation. The service operation is performed using at least one material component among the material components. The method further includes determining, by the computer processor, predicted contract data for the contract using a machine-learning model, the supply data, and the historical contract data. The machine-learning model is trained using a machine-learning algorithm and a training dataset. The method further includes determining, by the computer processor, whether the predicted contract data satisfies a predetermined criterion. The method further includes determining, by the computer processor and in response to the predicted contract data failing to satisfy the predetermined criterion, a contract adjustment based on the predicted contract data. The method further includes transmitting, by the computer processor, a command that adjusts the contract based on the contract adjustment.

In general, in one aspect, embodiments relate to a system that includes a server configured to store supply data. The system further includes various intermediary nodes configured to store a smart contract using a distributed ledger technology. The system further includes an automated contract manager comprising a computer processor. The automated contract manager is coupled to the server and the intermediary nodes. The automated contract manager obtains historical contract data regarding various contracts for various service operations. The automated contract manager extracts, from the server, supply data regarding various material components using a web scraping process. The supply data comprises chemical component price data, hot-rolled coil steel data, and ocean freight data. The automated contract manager identifies a contract among the contracts that is associated with a service operation among the service operations. The service operation is performed using at least one material component among the material components. The automated contract manager determines predicted contract data for the contract using a machine-learning model, the supply data, and the historical contract data. The first machine-learning model is trained using a machine-learning algorithm and a training dataset. The automated contract manager determines whether the predicted contract data satisfies a predetermined criterion. The automated contract manager determines, in response to the predicted contract data failing to satisfy the predetermined criterion, a contract adjustment based on the predicted contract data. The automated contract manager transmits, to the intermediary nodes, a command that adjusts the contract based on the contract adjustment. The contract is stored in the smart contract among the intermediary nodes.

In some embodiments, various API calls are transmitted, using at least one application programmable interface (API), to various servers. A web scraping process may extract supply data from the servers in response to transmitting the API calls. In some embodiments, a web scraping process automatically extracts supply data using various automated scraper bots. The automated scraper bots may obtain the supply data using a headless browser. In some embodiments, a command is transmitted to various intermediary nodes that implement a distributed ledger that includes a smart contract. The smart contract automatically changes one or more contract terms of a contract based on a contract adjustment. The intermediary nodes may receive an acknowledgment message indicating acceptance of the contract adjustment. In some embodiments, various intermediary nodes are blockchain nodes. In some embodiments, predicted contract data is determined for an electronic bidding process using a machine-learning model, supply data, and contract data. A determination may be made whether the predicted contract data satisfies a predetermined criterion. A contract adjustment may be determined based on the second predicted contract data and in response to the predicted contract data failing to satisfy the predetermined criterion. The contract adjustment changes one or more contract terms in the electronic bidding process.

In some embodiments, a training dataset is determined that includes labeled contract data, labeled supply data, and labeled cost data. A training operation of a machine-learning model may be performed for predicting material cost data using the training dataset and a machine-learning algorithm. The machine-learning model may be updated iteratively using various machine-learning epochs until a predetermined level of accuracy is satisfied for predicting the material cost data. In some embodiments, a machine-learning model is an artificial neural network that includes an input layer, various hidden layers, and an output layer. A machine-learning algorithm may be a backpropagation algorithm. In some embodiments, a predetermined criterion is a cost threshold corresponding to a predetermined difference between an initial cost estimate of a contract and a predicted cost estimate of the contract based on predicted contract data. In some embodiments, a command is transmitted to a control system coupled to a drill string at a well site. A service operation may include a drilling operation at the well site that is performed using the control system and the drill string. The command adjusts one or more drilling parameters of the drilling operation based on the contract adjustment.

In light of the structure and functions described above, embodiments of the invention may include respective means adapted to carry out various steps and functions defined above in accordance with one or more aspects and any one of the embodiments of one or more aspect described herein.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
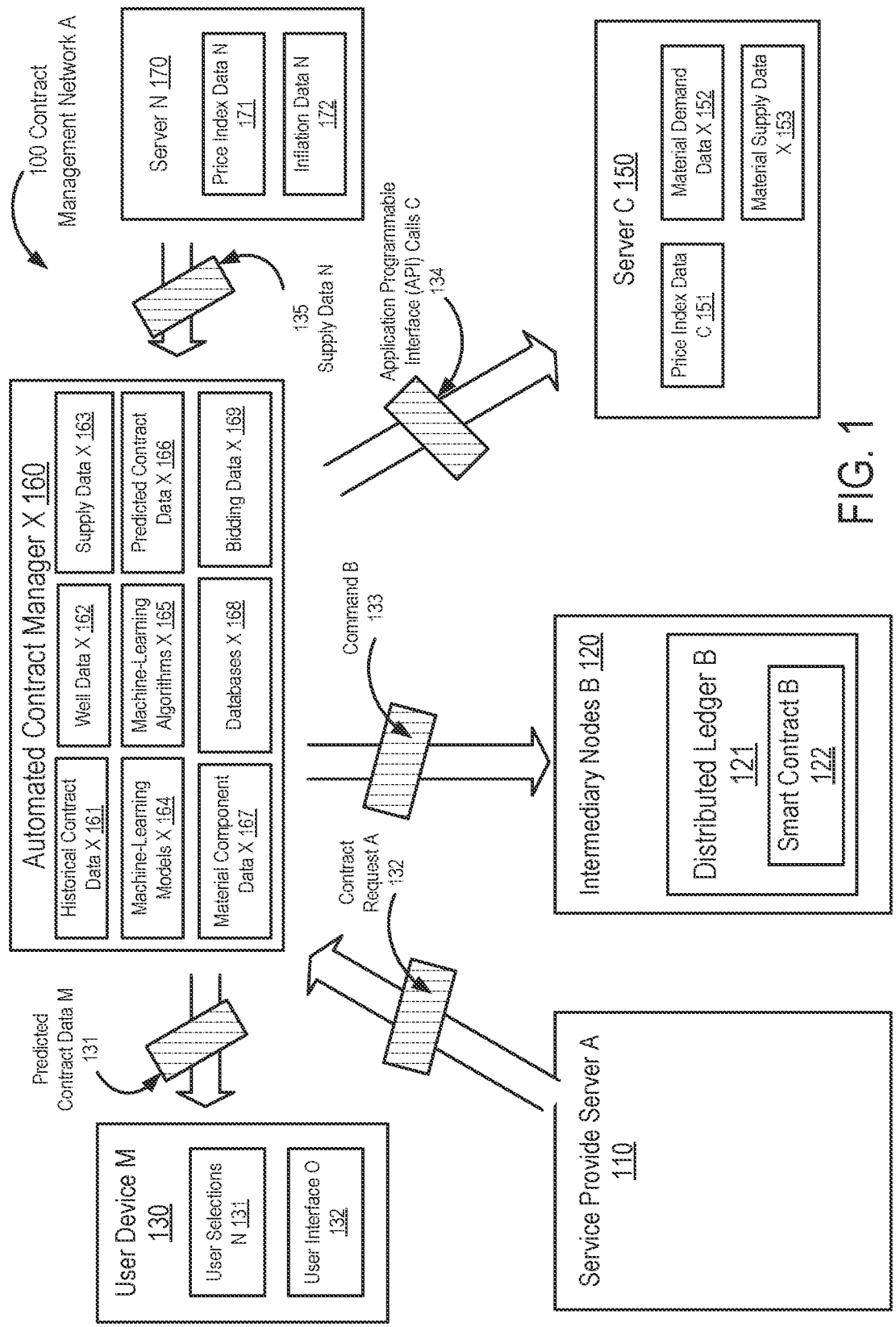
FIGS. 1 and 2 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods that use a machine-learning techniques to determine predicted contract data for use in automated decision-making in a contract management network. Rather than reacting to quick escalations and changes in market conditions for a particular contract or prospective bid, an automated contract manager may determine predicted contract data, such as future prices of material components, future labor costs, and/or the costs of line items during actual performance of the contract. This predicted contract data may be used to determine contract adjustments with respect to initial estimates prior to receipt of any actual requests for contract changes as well as whether to accept actual bids. In some embodiments, for example, predicted contract data is used to verify and validate contract requests received from various contracting entities (e.g., a service provider contracted to perform all or a portion of an executed contract as well as bids from various suppliers and/or subcontractors). As such, some embodiments provide automated notifications (e.g., an alert presented on a user device) relating to changes in initial contract estimates in addition to automatically performing contract adjustments based on predicted market conditions.

With respect to automated contract managers, an automated contract manager may employ various hyperautomation techniques in connection with predicting contract data. For example, hyperautomation may be a type of intelligent automation for various business applications that increase speed, efficiency, and accuracy for different types of business operations. Similar to other types of intelligent automation, the automated contract manager may combine robotic automations with artificial intelligence (AI) and machine learning (ML) techniques to simulate human interactions and automate complex processes. As such, an automated contract manager may identify and automate various contract-related processes, such as adjusting contract for service providers and product deliveries. Thus, an automated contract manager may be used to streamline and scale decision-making in relation to various contracts associated with multiple entities.

Furthermore, after a contract is identified as being affected by particular market changes, an automated contract manager may initiate one or more automated workflow for implementing contract adjustments, renegotiation operations, contract termination proceedings, and/or other revisions to performance of a particular contract (e.g., a change to a delivery date of various goods or a service operation for an executed contract may be delayed until market conditions prove viable for the executed contract). Additionally, some embodiments are used to determine specific contract adjustments based on predicted contract data, such as through an automated contract manager directly modifying payment amounts in contract line items and/or adjusting actual service operations using network commands. Thus, some embodiments are used to make automated decisions at various organizational levels using accurate contract data. Moreover, some contract adjustments may be implemented using smart contract technology and various intermediary nodes based on distributed ledger technology. Thus, contract terms embedded in a smart contract may be automatically updated based on predicted contract data as well renegotiated and revised based on changes to the underlying costs associated with the executed contract.

Furthermore, some embodiments use various machine-learning models and artificial intelligence techniques to determine predicted contract data. In particular, predicting actual performance conditions may be heavily impacted by volatility of economic conditions. To accurately predict such volatility, one or more machine-learning models may use supply data collected from various component indices. For example, material component costs may be important in the contract procurement process during pre-award and post award stages of an electronic bidding process (e.g., using a service provider portal for submitting electronic bids). In conjunction with historical contract data, a machine-learning workflow may subsequently output predicted contract data that describes the actual value and costs of underlying service operations (e.g., drilling operations for a wellbore, hydraulic fracturing operations for completing a well, maintenance operations at a refinery, etc.). Using predicted contract data that accurately describes the costs of performing a contract, contract adjustments can be recommended to various entities over a contract management network (e.g., using a contractor web portal) as well as automatically implemented through the contract management network.

Some embodiments provide further technical advantages over past techniques. For example, typical data aggregation may have low or no visibility to markets trends, commodity indices, inflation data, and/or supply chain disruptions. In contrast to user review and human contract analysis, a machine-learning workflow may provide frequent/continuous measurement of supply risks associated with fluctuations in market conditions. As soon as a machine-learning workflow identifies historical contract data and/or supply data that has one or more identifiable risks, an automated contract manager may determine adjusted parameters for one or more contract adjustments. Moreover, various technological techniques may be employed to enable collection and data preparation of input data for use in predicted contract data in the machine-learning workflow. For example, various web scraping processes may be applied to multiple remote servers in order to periodically update the input data set for predicting contract data. Likewise, this collected data may be further used for online training of various machine-learning models for performing related inference operations.

Turning to FIG. 1, FIG. 1 shows a schematic diagram in accordance with one or more embodiments. As shown in FIG. 1, a contract management network (e.g., contract management network A (100)) may include an automated contract manager (e.g., automated contract manager X (160)), various servers (e.g., service provider server A (110), server C (150), server N (170)), various intermediary nodes (e.g., intermediary nodes B (120)), and various user devices (e.g., user device M (130)), and/or various network elements (e.g., routers, switches, hubs, etc.). In some embodiments, for example, an automated contract manager includes hardware and/or software for collecting historical contract data (e.g., historical contract data X (161)) and supply data (e.g., supply data X (163)) from various data sources for use in predicting contract data (e.g., predicted contract data X (166)). Historical contract data may include information relating to previous contracts for past service operations or purchase contracts for particular goods, existing contracts relating to ongoing service operations, and/or contracts never or not yet executed (e.g., a prospective bid that is ongoing or not currently accepted). Examples of contract data may include contract identification numbers, contract values, specific contract line items, such as individual costs or performance dates of various line items, and descriptions of contract line items. Likewise, contract data may also include a prospective bid information (e.g., bidding data X (169)), such as a prospective bid's identification number, line item costs, and line item descriptions. Additionally, supply data may include market index information (e.g., price index data C (151), material demand data C (152), material supply data C (153), price index data N (171), material component data X (167)) relating to one or more line items in various contracts. In particular, supply data may include the costs of energy and fuel for delivering and/or using one or more material components in a service operation. Moreover, service operations may include construction operations, plant operations (e.g., for a manufacturing plant or a refinery), well operations (e.g., drilling operations, well completion operations such as hydraulic fracturing operations, well intervention operations, well maintenance operations, etc.), and various other operations that require contracts to be executed with contractors, suppliers, and other service entities.

In some embodiments, for example, the automated contract manager uses the predicted contract data to perform one or more contract adjustments relating to one or more executed contracts and/or one or more prospective bids from one or more service contractors. In particular, a user device (e.g., user device M (130)) may include hardware and/or software to receive real-time user selections (e.g., user selections N (131)) for one or more recommend contract adjustments by interacting with a user via a user interface (e.g., user interface O (132)). Specifically, the automated contract manager (e.g., automated contract manager X (160)) may communicate with a user using the user device (e.g., user device M (130)) to verify or approve changes to one or more executed contracts and/or prospective bids. An automated contract manager, one or more user devices, one or more intermediary nodes, and one or more servers may be computer systems similar to computer system (602) described below in FIG. 6 and the accompanying description.

In some embodiments, the automated contract manager includes hardware and/or software for determining predicted contract data using historical contract data (e.g., historical contract data X (161)), supply data (e.g., supply data X (163), supply data N (135)), as well as other input data sources. For example, predicted contract data may describe market vitality threats and potential financial interruptions to various contracts and service operations. In particular, an automated contract manager may decrease operational and contract risk by transmitting alert notifications to various entities regarding existing contracts, ongoing bidding, and/or prospective bidding. Likewise, an automated contract manager may determine high-precision digital cost estimates based on market index data for various commodities and resources used in construction and other service operations. In some embodiments, for example, the automated contract manager provides functionality for determined contract adjustments to existing bids and/or executed contracts. Rather than validating contract adjustments and bid adjustments manually and on an ad hoc basis, the automated contract manager may instantaneously predict future contract data for evaluating and/or proposing adjustments to any existing and future contracts. The contract adjustments and/or bid adjustments may be used to revise, negotiate, and/or reject any contracts and/or bids accordingly. While the automated contract manager is described with particular reference to various service contracts, some embodiments are also contemplated for contract relating to the purchase, sale, and/or delivery of various goods (e.g., an oil futures contract for the delivery of a particular amount of crude oil).

In some embodiments, supply data include information regarding various markets and/or raw material indices, such as labor reports, steel prices, chemical prices, energy prices, fuel prices, and other relevant indices, such as inflation indicators (e.g., inflation data N (172), such as a consumer price index (CPI) or a producer price index (PPI)). By monitoring changes in supply data, an automated contract manager includes may identify various potentials risks in advance with the assistance of predicted contract data, such as risks associated with changes in prices of commodities and logistic services. Based on acquired supply data, the automated contract manager may assess changes on current contracts and/or future contracts in bidding stages.

In some embodiments, an automated contract manager uses one or more web scraping processes to extract supply data from one or more servers. For example, an automated contract manager may use one or more application programmable interfaces (APIs) to automatically extract data from websites and other servers to integrate supply data into an artificial intelligence workflow. More specifically, supply data may be extracted from one or more servers using one or more API calls (e.g., API calls C (134)). An API call may be a network message that includes a request for specific data from one software application to another software application. In some embodiments, an API call may specify a proxy country, proxy type, custom headers, cookies, a predetermined waiting time, and execute a specific programming language (e.g., JavaScript) in a particular request. Additionally, a web scraping process may perform various software functions in connection with a web scraping API, such as proxy rotation, JavaScript rendering, CAPTCHA avoidance, and/or Internet Protocol (IP) blocking to extract supply data. After extracted data using one or more API calls, the automated contract manager may perform further HTML processing on the extracted data, such as for parsing using regular expressions and obtaining specific data in a structured form. Likewise, API calls may also be used to stream supply data to one or more databases.

In some embodiments, a web scraping process is performed using one or more headless browsers. A headless browser may include one or more software applications that extract data from a web server without using a graphical user interface to render a web page. For example, a web scraping process may analyze web page data while simulating operations of a real user that are browses web pages on the Internet. For example, a web scraping process may use an Internet crawler or automated scraper bot operating a particular script that sends a special header called a "user-agent" that identifies a web browser and its version.

In some embodiments, an automated contract manager receives one or more contract requests from one or more user devices and/or one or more servers. For example, a contract request may be a message transmitted by a user device or a server to the automated contract manager to revise an executed contract or an existing bid for a service operation. More specifically, a contract request may include one or more desired contract adjustments to an existing contract or prospective bid. As such, a contract request may be transmitted automatically by a server operated by a contractor. Likewise, a contract request may initiate a negotiation operation due to changing conditions in the underlying construction conditions, such as changes in prices of material inputs to the operation. Using predicted contract data, the automated contract manager may determine precise cost estimates of future operation conditions to evaluate whether to accept, reject, or revise contract adjustments associate with any contract requests. Thus, an automated contract manager may avoid the need for performing a manual process after changes occur to a supply chain and instead predict contract data, such as future inflation values and/or or changes in the price of materials and logistics for one or more constructions operations.

In some embodiments, a service provider server (e.g., service provider server A (110)) may be a remote server that includes hardware and/or software with functionality for managing and/or tracking equipment. For example, a service provider server may be linked to a service entity that performs one or more service operations, such as a drilling operation using drilling tools and various well operation equipment. Likewise, a remote server may be a server that communicates to various well sites and other construction sites over the Internet or through a cloud computing environment. When tools are committed to various well operations, the current or future operation with the respective tool may be logged automatically with the service provider server (e.g., by detecting a scan of the tool's unique identifier). Accordingly, a service provider server may transmit resource data (e.g., updates to changes in a respective tool's cost for a particular well site) to an automated contract manager.

In some embodiments, for example, the automated contract manager (e.g., automated contract manager X (160)) applies one or more machine-learning algorithms (e.g., machine-learning algorithms X (165)), which may include an unsupervised ML algorithm, a reinforcement ML algorithm, a self-supervised ML algorithm, etc., to train a machine-learning model (e.g., machine-learning model X (164)). Specifically, an automated contract manager may use a machine-learning model to generate predicted contract data and/or contract adjustments based on data inputs regarding historical contract data, well data (such as historical drilling data, geological data, seismic data, and other well data sources), scraped supply data, and other input data. In some embodiments, an automated contract manager is used within a contract management network for planning, synchronizing and optimizing the logistics of service operations based on one or more adjusted contracts.

With respect to machine-learning models, different types of machine-learning models may be used, such as convolutional neural networks, deep neural networks, recurrent neural networks, support vector machines, decision trees, inductive learning models, deductive learning models, unsupervised learning models, supervised learning models, reinforcement learning models, self-supervised learning models, etc. In some embodiments, an automated contract manager may generate augmented or synthetic data to produce a large amount of interpreted data for training a particular model. Likewise, a machine-learning model may be trained using one or more machine-learning algorithms. For example, a backpropagation algorithm may be used to train a neural network. The training data may include the historical data for one or more service operations. An automated contract manager may continue to train the machine-learning model by a self-feeding database (e.g., one of databases X (168)) for a historical learning process.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

In some embodiments, one or more intermediary nodes (e.g., intermediary nodes B (120)) are used in a contract management network to exchange contract data and/or make contract adjustments to existing contracts and prospective bids, such as using smart contracts (e.g., smart contract B (122)). For example, one or more intermediary nodes may be implemented using distributed ledger technology (e.g., distributed ledger B (121) that is stored among intermediary nodes B (120)). For more information on distributed ledger technology, see the section below titled DISTRIBUTED LEDGER TECHNOLOGY.

In some embodiments, an automated contract manager uses one or more software applications to share data with a smart contract that subsequently processes the shared data (e.g., to implement a contract adjustment). As such, the smart contract may receive predicted contract data or a command specifying a type of contract adjustment. As such, a smart contract may be used to change more terms associated with an executed contract or a prospective bid. In a distributed ledger, a data transaction may be recorded, such as one data transaction from an automated contract manager that makes a contract adjustment to the smart contract, and another data transaction where a party, such as a contractor, requests a contract adjustment. The smart contract may sign processed contract data, encrypt the data with the public key of a recipient, store the contract data, and generate a location address for the contract data, and send an update with changes to the data over to the recipient (e.g., agents of one of the contracting parties).

In some embodiments, various types of well data (e.g., well data X (162)) are collected over a contract management network, such as well surface data and well sub-surface data from various well sites, in order to automatically perform one or more contract adjustments. For example, well sub-surface data may include downhole pressure and temperature measurements acquired by downhole sensors. On the other hand, well surface data may include wellhead temperature and pressure data. The well management network may also collect production data, drilling data, completion data, and failure data, such as geological failure data and/or mechanical failure data. Production data may include total flow rate data, water cut data, and gas-oil ratio data. Drilling data may include information regarding well paths, rate of penetration data, weight-on-bit data, etc. Completion data may include hydraulic fracturing data, data for other types of stimulation operations, etc. Likewise, the contract management network may also collect data from users and entities responsible for implementing and performing service operations (e.g., user data, cost data, service provider data) from one or more user devices and/or data servers. Cost data may include information describing material costs, tools costs, hourly wages for service company workers, etc. Service provider data may include oilfield services availability, time required to perform various well operations, etc.

Figure 2:
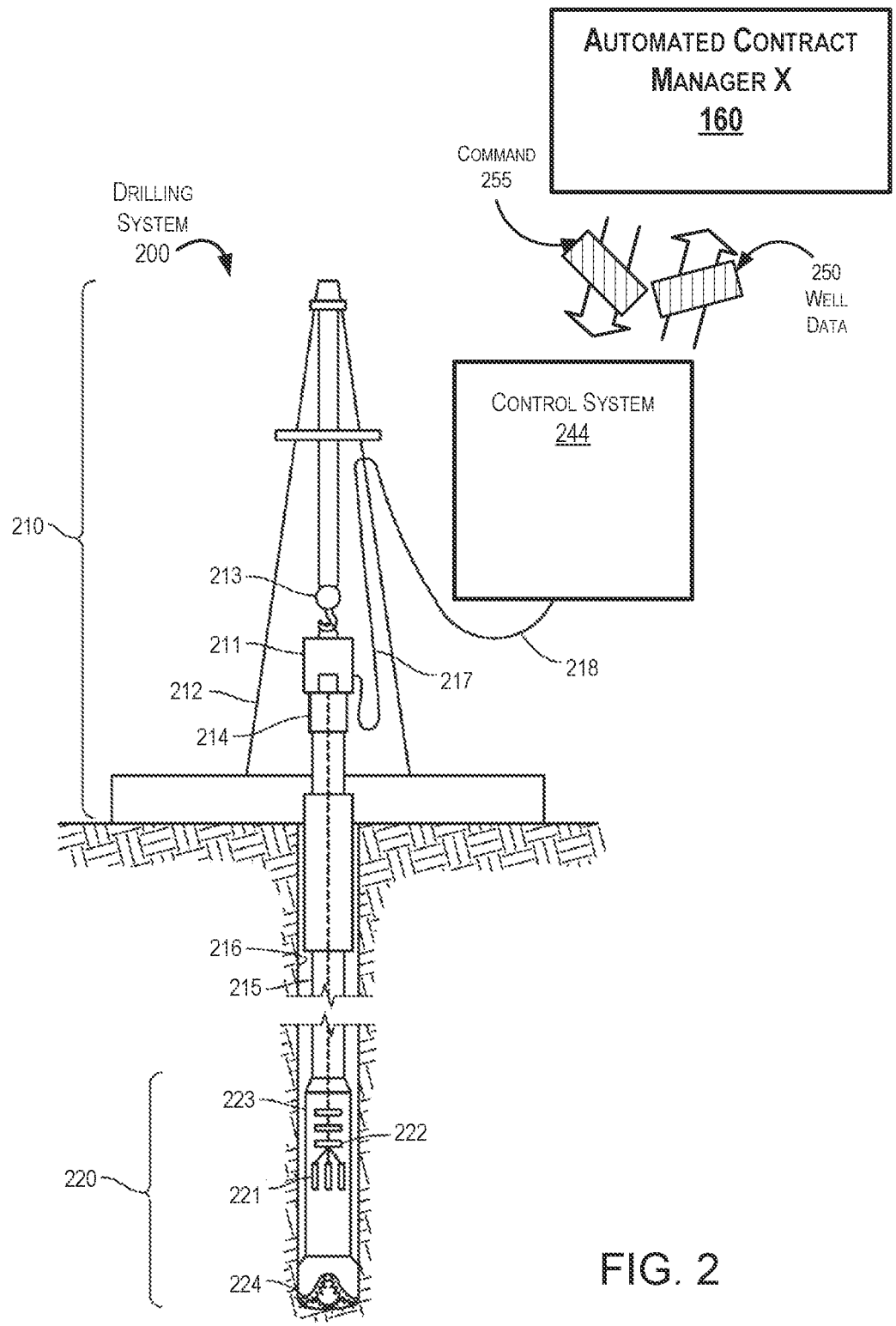

Turning to FIG. 2, FIG. 2 shows a drilling system in accordance with one or more embodiments. While a drilling operation is shown for illustrating one example of a service operation, other types of service operations and associated contracts are also contemplated for use with one or more automated contract processes. In FIG. 2, a drilling system (200) may include a top drive drill rig (210) arranged around the setup of a drill bit logging tool (220). A top drive drill rig (210) may include a top drive (211) that may be suspended in a derrick (212) by a travelling block (213). In the center of the top drive (211), a drive shaft (214) may be coupled to a top pipe of a drill string (215), for example, by threads. The top drive (211) may rotate the drive shaft (214), so that the drill string (215) and a drill bit logging tool (220) cut the rock at the bottom of a wellbore (216). A power cable (217) supplying electric power to the top drive (211) may be protected inside one or more service loops (218) coupled to a control system (244). As such, drilling mud may be pumped into the wellbore (216) through a mud line, the drive shaft (214), and/or the drill string (215).

The control system (244) may include one or more programmable logic controllers (PLCs) that include hardware and/or software with functionality to control one or more processes performed by the drilling system (200). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress. For example, the control system (244) may be coupled to the sensor assembly (223) in order to perform various program functions for up-down steering and left-right steering of the drill bit (224) through the wellbore (216). While one control system is shown in FIG. 2, the drilling system (200) may include multiple control systems for managing various well drilling operations, maintenance operations, well completion operations, and/or well intervention operations.

The wellbore (216) may include a bored hole that extends from the surface into a target zone of the hydrocarbon-bearing formation, such as the reservoir. An upper end of the wellbore (216), terminating at or near the surface, may be referred to as the "up-hole" end of the wellbore (216), and a lower end of the wellbore, terminating in the hydrocarbon-bearing formation, may be referred to as the "down-hole" end of the wellbore (216). The wellbore (216) may facilitate the circulation of drilling fluids during well drilling operations, the flow of hydrocarbon production ("production") (e.g., oil and gas) from the reservoir to the surface during production operations, the injection of substances (e.g., water) into the hydrocarbon-bearing formation or the reservoir during injection operations, or the communication of monitoring devices (e.g., logging tools) into the hydrocarbon-bearing formation or the reservoir during monitoring operations (e.g., during in situ logging operations).

As further shown in FIG. 2, sensors (221) may be included in a sensor assembly (223), which is positioned adjacent to a drill bit (224) and coupled to the drill string (215). Sensors (221) may also be coupled to a sensor assembly (223) that includes a processor, memory, and an analog-to-digital converter (222) for processing sensor measurements. For example, the sensors (221) may include acoustic sensors, such as accelerometers, measurement microphones, contact microphones, and hydrophones. Likewise, the sensors (221) may include other types of sensors, such as transmitters and receivers to measure resistivity, gamma ray detectors, etc. The sensors (221) may include hardware and/or software for generating different types of well logs (such as acoustic logs or sonic longs) that may provide well data about a wellbore, including porosity of wellbore sections, gas saturation, bed boundaries in a geologic formation, fractures in the wellbore or completion cement, and many other pieces of information about a formation. If such well data is acquired during well drilling operations (i.e., logging-while-drilling), then the information may be used to make adjustments to drilling operations in real-time. Such adjustments may include rate of penetration (ROP), drilling direction, altering mud weight, and many others drilling parameters.

In some embodiments, acoustic sensors may be installed in a drilling fluid circulation system of a drilling system (200) to record acoustic drilling signals in real-time. Drilling acoustic signals may transmit through the drilling fluid to be recorded by the acoustic sensors located in the drilling fluid circulation system. The recorded drilling acoustic signals may be processed and analyzed to determine well data, such as lithological and petrophysical properties of the rock formation. This well data may be used in various applications, such as steering a drill bit using geosteering, casing shoe positioning, etc.

Keeping with FIG. 2, when completing a well, one or more well completion operations may be performed prior to delivering the well to the party responsible for production or injection. Well completion operations may include casing operations, cementing operations, perforating the well, gravel packing, directional drilling, hydraulic and acid stimulation of a reservoir region, and/or installing a production tree or wellhead assembly at the wellbore (216). Likewise, well operations may include open-hole completions or cased-hole completions. For example, an open-hole completion may refer to a well that is drilled to the top of the hydrocarbon reservoir. Thus, the well is cased at the top of the reservoir, and left open at the bottom of a wellbore. In contrast, cased-hole completions may include running casing into a reservoir region. Cased-hole completions are discussed further below with respect to perforation operations.

In one well delivery example, the sides of the wellbore (216) may require support, and thus casing may be inserted into the wellbore (216) to provide such support. After a well has been drilled, casing may ensure that the wellbore (216) does not close in upon itself, while also protecting the wellstream from outside incumbents, like water or sand. Likewise, if the formation is firm, casing may include a solid string of steel pipe that is run on the well and will remain that way during the life of the well. In some embodiments, the casing includes a wire screen liner that blocks loose sand from entering the wellbore (216).

In another well delivery example, a space between the casing and the untreated sides of the wellbore (216) may be cemented to hold a casing in place. This well operation may include pumping cement slurry into the wellbore (216) to displace existing drilling fluid and fill in this space between the casing and the untreated sides of the wellbore (216). Cement slurry may include a mixture of various additives and cement. After the cement slurry is left to harden, cement may seal the wellbore (216) from non-hydrocarbons that attempt to enter the wellstream. In some embodiments, the cement slurry is forced through a lower end of the casing and into an annulus between the casing and a wall of the wellbore (216). More specifically, a cementing plug may be used for pushing the cement slurry from the casing. For example, the cementing plug may be a rubber plug used to separate cement slurry from other fluids, reducing contamination and maintaining predictable slurry performance. A displacement fluid, such as water, or an appropriately weighted drilling fluid, may be pumped into the casing above the cementing plug. This displacement fluid may be pressurized fluid that serves to urge the cementing plug downward through the casing to extrude the cement from the casing outlet and back up into the annulus.

Keeping with well operations, some embodiments include perforation operations. More specifically, a perforation operation may include perforating casing and cement at different locations in the wellbore (216) to enable hydrocarbons to enter a wellstream from the resulting holes. For example, some perforation operations include using a perforation gun at different reservoir levels to produce holed sections through the casing, cement, and sides of the wellbore (216). Hydrocarbons may then enter the wellstream through these holed sections. In some embodiments, perforation operations are performed using discharging jets or shaped explosive charges to penetrate the casing around the wellbore (216).

In another well delivery, a filtration system may be installed in the wellbore (216) in order to prevent sand and other debris from entering the wellstream. For example, a gravel packing operation may be performed using a gravel-packing slurry of appropriately sized pieces of coarse sand or gravel. As such, the gravel-packing slurry may be pumped into the wellbore (216) between a casing's slotted liner and the sides of the wellbore (216). The slotted liner and the gravel pack may filter sand and other debris that might have otherwise entered the wellstream with hydrocarbons.

In another well delivery, a wellhead assembly may be installed on the wellhead of the wellbore (216). A wellhead assembly may be a production tree (also called a Christmas tree) that includes valves, gauges, and other components to provide surface control of subsurface conditions of a well.

In some embodiments, an automated contract manager is coupled to one or more control systems (e.g., automated contract manager X (160) is coupled to control system (244)) at a wellsite. For example, an automated contract manager may include hardware and/or software to collect well operation data (e.g., well data (250)) from one or more well sites. Likewise, the automated contract manager X (160) may monitor various well operations performed by various service entities relating to one or more contracts. In some embodiments, an automated contract manager is a controller located on a server remote from the well site. In some embodiments, an automated contract manager may be similar to a control system coupled to one or more systems for performing a service operation, such as a drilling system, a manufacturing plant, or a refinery.

In some embodiments, for example, a well operation may include various logistical considerations based on issues such as service providers and material availability, nearby activities in surrounding wells, tool availability, weather conditions, safety concerns, etc., as well as various service provider considerations (e.g., local contract conditions, the scope of the sub-tasks within the contracts, operational aspects, involved parties, interdepartmental interactions, etc.). As such, human site planning may be a tedious process that is difficult to re-schedule based on changing supply conditions. Accordingly, some embodiments include an automated contract manager that may be a "smart system" or "expert system" that automatically plans, synchronizes, and/or readjusts contracts for one or more well operations in line with one or more contracts. In other words, an automated contract manager may be an artificial intelligence entity operation on a contract management network (e.g., as a network controller) that performs such functionality. Moreover, some embodiments include an automated contract manager with self-decision functionality that operates independently and with flexibility.

In some embodiments, well intervention operations may include various operations carried out by one or more service entities for an oil or gas well during its productive life (e.g., fracking operations, CT, flow back, separator, pumping, wellhead and Christmas tree maintenance, slickline, wireline, well maintenance, stimulation, braded line, coiled tubing, snubbing, workover, subsea well intervention, etc.). For example, well intervention activities may be similar to well completion operations, well delivery operations, and/or drilling operations in order to modify the state of a well or well geometry. In some embodiments, well intervention operations provide well diagnostics, and/or manage the production of the well. With respect to service entities, a service entity may be a company or other actor that performs one or more types of oil field services, such as well operations, at a well site. For example, one or more service entities may be responsible for performing a cementing operation in the wellbore (216) prior to delivering the well to a producing entity.

Moreover, an automated contract manager may include functionality for coordinating various service operations, such as construction operations and oilfield services, such as exploratory operations, pilot well operations, drilling operations, and well completion operations based on executed contracts. To adjust a service operation based on one or more contract adjustments, the automated contract manager may use various commands (e.g., command B (133), command (255)) to implement a change, e.g., by transmitting commands to various network devices (e.g., control system (244)) in a drilling system as well as various user devices at the well site. In some embodiments, for example, a command is a network message that automatically assigns or reassigns tasks or operations to various service entities at a well site. In response to a command, a device (e.g., an automated contract manager, a control system, or an intermediary node) may transmit an acknowledgment message over a contract management network indicating that the change was implemented. For example, an automated contract manager may communicate with one or more service entities through various user devices, e.g., by receiving periodic status reports, sending messages through user interfaces, etc. Likewise, the automated contract manager may also collect other well operation data, such as sensor data from the drilling system (200), service provider data, resource data (including rig and rigless site daily reports), feedback through a human machine interface from other personnel at the well site, and/or data from a historian operating at the well site.

In some embodiments, production wells and/or injection wells are used in one or more stimulation operations. For example, one type of stimulation operation is a water-alternating-gas (WAG) operation. A WAG operation may be a cyclic process of injecting water followed by gas. Using a WAG injection, macroscopic or microscopic sweep efficiency may be improved for a reservoir, e.g., by maintaining nearly initial high pressure, slow down any gas breakthroughs, and reduce oil viscosity. Likewise, WAG injections may also decrease residual oil saturation resulting from three phase flows and effects associated with relative permeability hysteresis. Thus, some stimulation operations may produce gas flooding, which is a type of enhanced oil recovery (EOR) method for increasing recovery of light to moderate oil reservoirs. In some stimulation operations, water may be injected during the initial phase of the operation and followed by a gas (e.g., carbon dioxide) because water may have a higher mobility ratio than the injected gas, thereby preventing breakthroughs in the reservoir. Injected gas may be a mixture of hydrocarbon gas or nonhydrocarbon gases. With hydrocarbon gases, the gas mixture may include methane, ethane, and propane for achieving a miscible or immiscible gas-oil system in the reservoir. With nonhydrocarbon gases, the gas mixture may include carbon dioxide ($CO_2$), nitrogen ($N_2$), and some exotic gases that displace fluid in the reservoir. Likewise, gas may also be injected directly into a reservoir, e.g., into the gas cap, to compensate for the reservoir's pressure decline.

Furthermore, a stimulation injection during a stimulation operation may correspond to various injection parameters, such as bank size, cycle time, and a predetermined water-gas ratio (also called a "WAG ratio"). Bank size may refer to a size of sequential banks of fluids (e.g., oil, $CO_2$ and water) formed in the reservoir rock in response to a stimulation operation that migrate from the injection to the production wells. For illustration, a WAG ratio of 1:1 may result in a high oil production for one or more production wells, such as production wells coupled to a miscible reservoir. Based on some reservoir parameters such as oil composition, gas flooding can be carried out in miscible or immiscible conditions. Moreover, different types of stimulation operations may use different stimulation parameters. Examples of different stimulation operations may include: (1) continuous gas injections; (2) WAG injections; (3) simultaneous water-alternating-gas (SWAG) injections; and (4) tapered WAG injections. Different strategies have been developed by the petroleum industry to cope with these conditions.

In particular, hydrocarbon reserves may be trapped within certain low permeability formations, such as sand, carbonate, and/or shale formations. Thus, stimulation treatments may be performed by a stimulation control system coupled to a well completion assembly or well completion system that enhances well productivity at one or more wells, where one type of stimulation treatment is hydraulic fracturing. In some embodiments, for example, hydraulic fracturing includes injecting high viscosity fluids into a wellbore at a sufficiently high injection rate so that enough pressure is produced within the wellbore to split the formation. As such, a stimulation operation may be determined that achieves a desired height and/or length of one or more induced fractures.

Furthermore, various stimulation procedures may be employed that use one or more techniques to ensure that an induced fracture becomes conductive after injection ceases. For example, during acid fracturing of carbonate formations, acid-based fluids may be injected into the formation to create an etched fracture and conductive channels. These conductive channels may be left open upon closure of the induced fracture. With sand or shale formations, a proppant may be included with the hydraulic fracturing fluid such that the induced fracture remains open during or following a stimulation treatment. Likewise, in carbonate formations, a stimulation treatment may include both acid fracturing fluids and proppants. Accordingly, heat produced within a formation, acid, or aqueous water transmitted into the formation may all play a role in producing reactions causing one or more microfractures in a formation.

Keeping with hydraulic fracturing, a hydraulic fracturing operation may include well completion assembly with one or more inflatable packers as well as a work string or casing string that extends within a wellbore. A casing string may include steel casing or pipe that may be divided into surface casing, intermediate casing, and/or production casing. Packers may include inflatable packers that seal an annulus defined between well completion equipment and an inner wall of the wellbore in order to divide a formation into multiple wellbore intervals. These wellbore intervals may be separately or simultaneously stimulated during a hydraulic stimulation operation using a stimulation control system. Thus, in a hydraulic fracturing operation, a hydraulic fracturing fluid may be pumped through the casing string and into a targeted formation using various perforations (i.e., open holes) in the casing string.

By injecting the hydraulic fracturing fluid at pressures high enough to cause the rock within the targeted formation to fracture, the hydraulic fracturing operation may "break down" the formation. As high-pressure fluid injection continues, a fracture may continue to propagate into a fracture network. This high pressure for injecting the hydraulic fracturing fluid may be referred to as the "propagation pressure" or "extension pressure." As an induced fracture continues to grow, a proppant, such as sand, may be added to the fracturing fluid. Once a desired fracture network is formed, the fluid flow may be reversed, and the liquid portion of the fracturing fluid is removed. The proppant is intentionally left behind to prevent the fractures from closing onto themselves due to the weight and stresses within the formation. Accordingly, the proppant may "prop" or support the induced fractures to remain open, by remaining sufficiently permeable for hydrocarbon fluids to flow through the induced fracture. Thus, a proppant may form a packed bed of particles with interstitial void space connectivity within a formation. Accordingly, a higher permeability fracture may result from the hydraulic fracturing operation.

In some embodiments, for example, a hydraulic fracturing fluid with an activator is injected into the formation, where the fluid migrates within the large fractures. Upon a reaction caused by the activator, the injection fluid may produce one or more gases and heat, thereby causing the microfractures to be created within the formation. Thus, a stimulation treatment may provide pathways for the hydrocarbon deposits trapped within the formation to migrate and be recovered by a production well. In other words, hydraulic stimulation operations may be applied to formations that easily fracture to produce more microfractures with little plastic deformation under compression.

While FIGS. 1 and 2 shows various configurations of components, other configurations may be used without departing from the scope of the disclosure. For example, various components in FIGS. 1 and 2 may be combined to create a single component. As another example, the functionality performed by a single component may be performed by two or more components.

Figure 3:
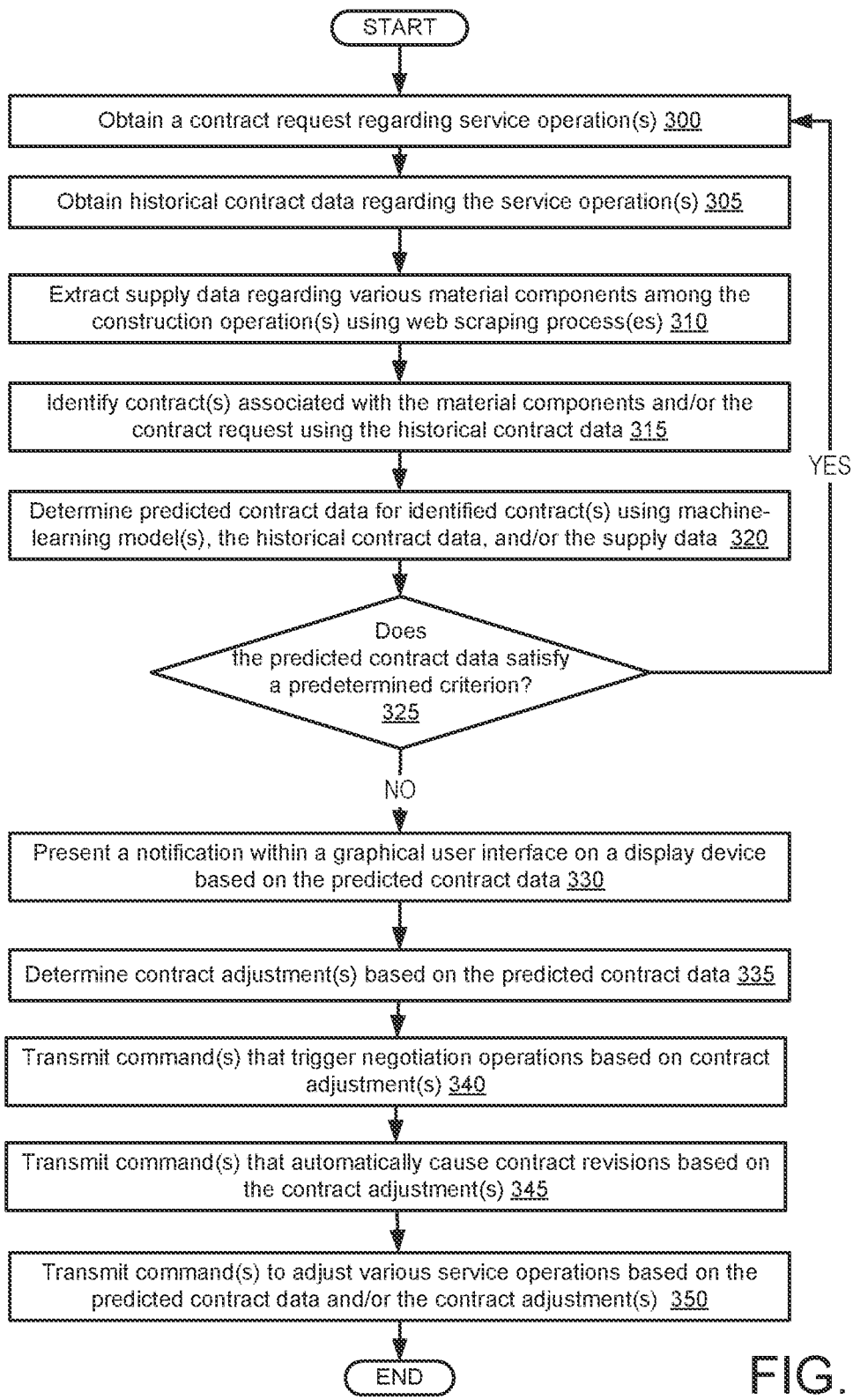
FIG. 3 shows a flowchart in accordance with one or more embodiments.

Turning to FIG. 3, FIG. 3 shows a flowchart in accordance with one or more embodiments. Specifically, FIG. 3 describes a general method for determining predicted contract data in accordance with one or more embodiments. One or more blocks in FIG. 3 may be performed by one or more components (e.g., automated contract manager X (160)) as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, a contract request is obtained regarding one or more service operations in accordance with one or more embodiments. In some embodiments, one or more contract requests are transmitted by a user device to an automated contract manager in order to request contract information, such as predicted contract data for a prospective or ongoing bid as well as an executed contract. For example, the contract request may be a network message that includes an automated request for determining the actual cost of an identified contract's performance at a future date. Thus, a contract request may be used to determine whether one or more contracting entities are receiving a payment greater or less than the cost of the contract prior to actual performance. Likewise, contract requests may also be used to analyze specific portions of a contract, such as the cost for completing one or more project milestone or satisfying one or more key performance indicators (KPIs).

In Block 305, historical contract data are obtained regarding one or more service operations in accordance with one or more embodiments. For example, historical contract data may include data for line items, unit price per contract, contract values, contract timeline data, and other contract information. Likewise, historical contract data may refer to existing contracts and contracts under bidding by service providers. Furthermore, contracts and bids may be submitted and executed using an electronic process, such as electronic bidding process or an electronic transaction process implemented using a contract management network. Furthermore, historical contract data may be obtained from one or more contract databases and/or business financial applications.

In Block 310, supply data are extracted regarding various material components among one or more service operations using one or more web scraping processes in accordance with one or more embodiments. For example, an automated contract manager may use various web scraping processing, such as web scraping API calls or headless browsers to obtain market intelligence and commodity index prices from various servers. In particular, supply data may be obtained from accredited market and commodities indices in order to identify any anticipated risks (e.g., inflation or supply chain disruptions) in one or more contracts.

Moreover, historical contract data and/or supply data may undergo various data preprocessing operations for input data. For example, a machine-learning model may have a particular input parameter associated with a particular data type (e.g., a contract value may need to be converted into a numerical input in an amount equivalent to United States dollars). Another data preprocessing operation may include a data cleaning operation that may be used remove noise and undesired input features for use in inference operations and/or training a machine-learning model. Additionally, data cleaning may also identify and handle missing values within a dataset and prepare the raw data for use by one or more models by removing outliers, smoothing noisy data, and correcting inconsistent data. In particular, a data preprocessing pipeline may be implemented in a contract management network in order to perform preprocessing operations on collected data (e.g., data downloaded from various databases or acquired in a web scraping process) from various servers. The data preprocessing pipeline may send collected data to a data store for use in a machine-learning workflow. After preprocessing, historical contract data and/or supply data may be relayed to an automated contract manager. Likewise, the preprocessing may also be performed by an automated contract manager in some embodiments.

In some embodiments, supply data is collected for one or more index categories. Examples of various index categories and corresponding index examples are shown in Table 1 below:

TABLE 1

Examples of Supply Data Indices

| Index Category | Index Name |
| --- | --- |
| United States (US) Chemicals | US Producer Price Index (PPI) for Chemical Manufacturing; |
| China Chemicals | China PPI, Raw chemicals and Chemical Products |
| India Chemicals | India PPI, Basic Heavy Inorganic Chemicals |

TABLE 1-continued

Examples of Supply Data Indices

| Index Category | Index Name |
| --- | --- |
| Germany Chemicals | Germany PPI, Misc Organic Chemicals & Other Inorganic Basic Chemicals |
| Steel/Specialty Steel | US Spot Price, Hot-Rolled Coil (HRC) Steel China Spot Price. HRC Steel Europe Spot Price, HRC Steel Europe Spot Price, Charge Chrome |
| Ocean Freight | Drewry World Container Index (WCI) |

In Block 315, one or more contracts associated with various material components and/or one or more contract requests are identified using historical contract data in accordance with one or more embodiments. For example, an automated contract manager may match line items or historical contract data with various material components that are potentially affected by various market circumstances, such as changing prices of the material components for operating chemical processes for a service operation. Thus, an automated contract manager may match supply data collected from various indices with corresponding service operations specified for performance among contracts and their line items.

In Block 320, predicted contract data are determined for one or more identified contracts using one or more machine-learning models, historical contract data, and/or supply data in accordance with one or more embodiments. In some embodiments, for example, an automated contract manager determines one or more predictions of market conditions, such as for inflationary pressures or supply shortages. Accordingly, predicted contract data may be used to analyze the impact on specific contracts and future contract procurements. Likewise, the predicted contract data may be used to determine additional leverage for negotiating with service providers and minimize operational risks, such as the number of related contract claims. Likewise, predicted contract data may be used to measure and/or recommend corresponding compensation to various service providers associated with any identified contracts. Predicted contract data may also undergo validation and verification processes, such as to ensure accurate decision-making processes are implemented. In particular, validation and verification may analyze relevant datasets related to one or more identified contracts as well as global market indices to determine predicted contract data.

In one or more embodiments, one or more machine-learning models obtain various input parameters to determine predicted contract data. For example, input parameter data may include historical contract data, such as various contract parameters associated with an identified contract. Examples of input parameter data may include contract items, such as material component prices, contract line item description data. Input data may also include various types of supply data, such as specific market indices associated with an identified contract. Additionally, input data may also include contractor request information, such as whether the predicted contract data is associated with a desired cost estimate of one or more service operations from one or more contracting entities.

In some embodiments, a machine-learning model is trained in one or more training operations using labeled training data. For example, labeled input data may include various material component prices and descriptions of line items, as well as current supply data relating to one or more markets. Likewise, labeled output data may correspond to the actuals price of various material components and other costs (e.g., labor costs) at the time of a historical contract's performance. By training and updating the machine-learning model, the machine-learning model may learn how global market indices affect future contract costs. Thus, the predicted contract data may enable informed decision-making of actual conditions in performing service operations for a contract based on the current market index.

In some embodiments, a data integration process is performed on collected data. In particular, collected data from historical contract data sources and supply data sources may be transformed into a form appropriate for use as input data. For example, collected data may be timestamped or associated with a specific market (e.g., country) as part of the data transformation.

In Block 325, a determination is made whether predicted contract data satisfies a predetermined criterion in accordance with one or more embodiments. For example, one or more predetermined criteria may be used to determine one or more contract adjustments for an identified contract affecting a service provide and/or another contracting entity. In some embodiments, a predetermined criterion corresponds to a specific cost threshold. For example, if predicted contract data indicates that the overall performance cost of a specific contract will increase by more than 5% of the original contract price, an automated contract manager may determine the potential financial risk according to the cost increases. Other predetermined criterion may relate to time delays in performing individual tasks or completing an executed contract. As such, predetermined criteria may be based on different types of financial risks for determining contract adjustments as well as whether to terminate an identified contract or bid. In some embodiments, predetermined criteria are based on historical contract data and benchmarks.

If the predicted contract data satisfies the predetermined criterion, the process may proceed to Block 300. If the predicted contract data fails to satisfy the predetermined criterion, the process may proceed to Block 330. After returning to Block 300, a machine-learning workflow may iteratively collect historical contract data and/or supply data until another contract request is received. On the other hand, the machine-learning workflow until predicted contract data fails the predetermined criterion, such as due to heavy volatility for one or more material components among one or more identified contracts.

In Block 330, a notification is presented within a graphical user interface on a display device based on predicted contract data in accordance with one or more embodiments. For example, an automated contract manager may issue warnings to various user devices and/or servers based on a comparison between predicted contract data and the contacts' line item structure and material components. In some embodiments, one or more recommendations are provided for various decisions regarding how to proceed. In particular, notifications may be presented in a graphical user interface on a display device indicating whether all or a portion of a contract or bid may require revisions, negotiations, and/or possible rejection. In some embodiments, the automated contract manager may indicate an optimal option based on the predicted contract data. As such, notifications may be real-time alerts to user devices associated with contract entities authorized to approve contract adjustments (e.g., potential price increases) well in advance. Thus, notifications to various devices through a contract management network may assist in avoiding unexpected contract requests for executed contracts or prospective bids.

In Block 335, one or more contract adjustments are determined based on predicted contract data in accordance with one or more embodiments. For example, a contract adjustment may specify changes to one or more line items (e.g., overall contract costs, individual material component costs, changes to performance dates, scope of work, etc.). Likewise, a contract adjustment may include an automated decision to reject, authorize a contract adjustment, or request to renegotiate a particular contract.

In Block 340, one or more commands are transmitted that trigger negotiation operations based on one or more contract adjustments in accordance with one or more embodiments.

In Block 345, one or more commands are transmitted automatically that cause contract revisions based on one or more contract adjustments in accordance with one or more embodiments. For example, a command may be transmitted to one or more intermediary nodes storing one or more smart contracts. The command may include predicted contract data that triggers one or more smart contract operations. After changing one or more contract terms, the smart contract may transmit an acknowledgment message back to the requesting device, such as an automated contract manager.

In Block 350, one or more commands are transmitted that adjust various service operations based on predicted contract data and/or one or more contract adjustments in accordance with one or more embodiments. For example, one or more control systems may adjust one or more service operations in response to commands from an automated contract manager. The automated contract manager may change various operations in response to a particular contract adjustment.

Figure 4:
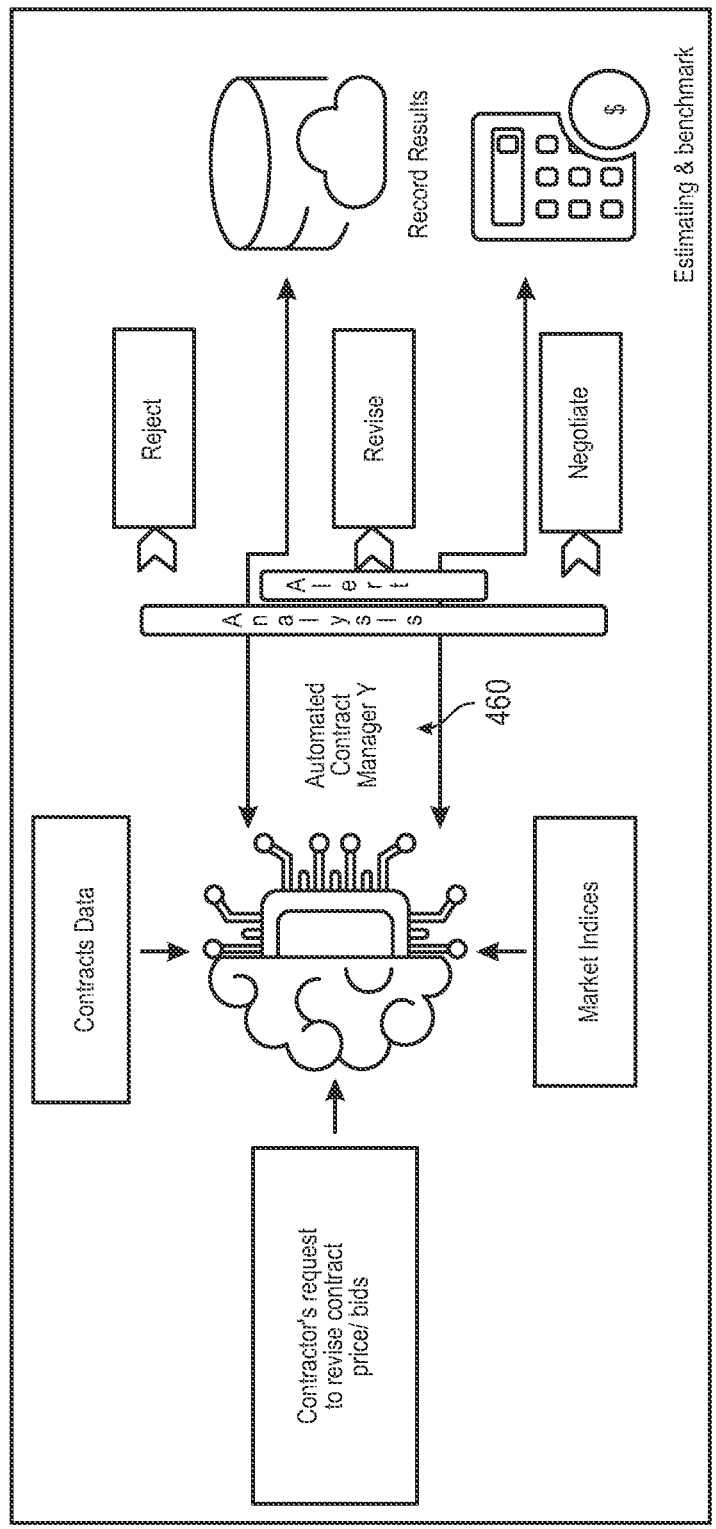
FIGS. 4, 5A, 5B, and 5C show examples in accordance with one or more embodiments.
Figure 5A:
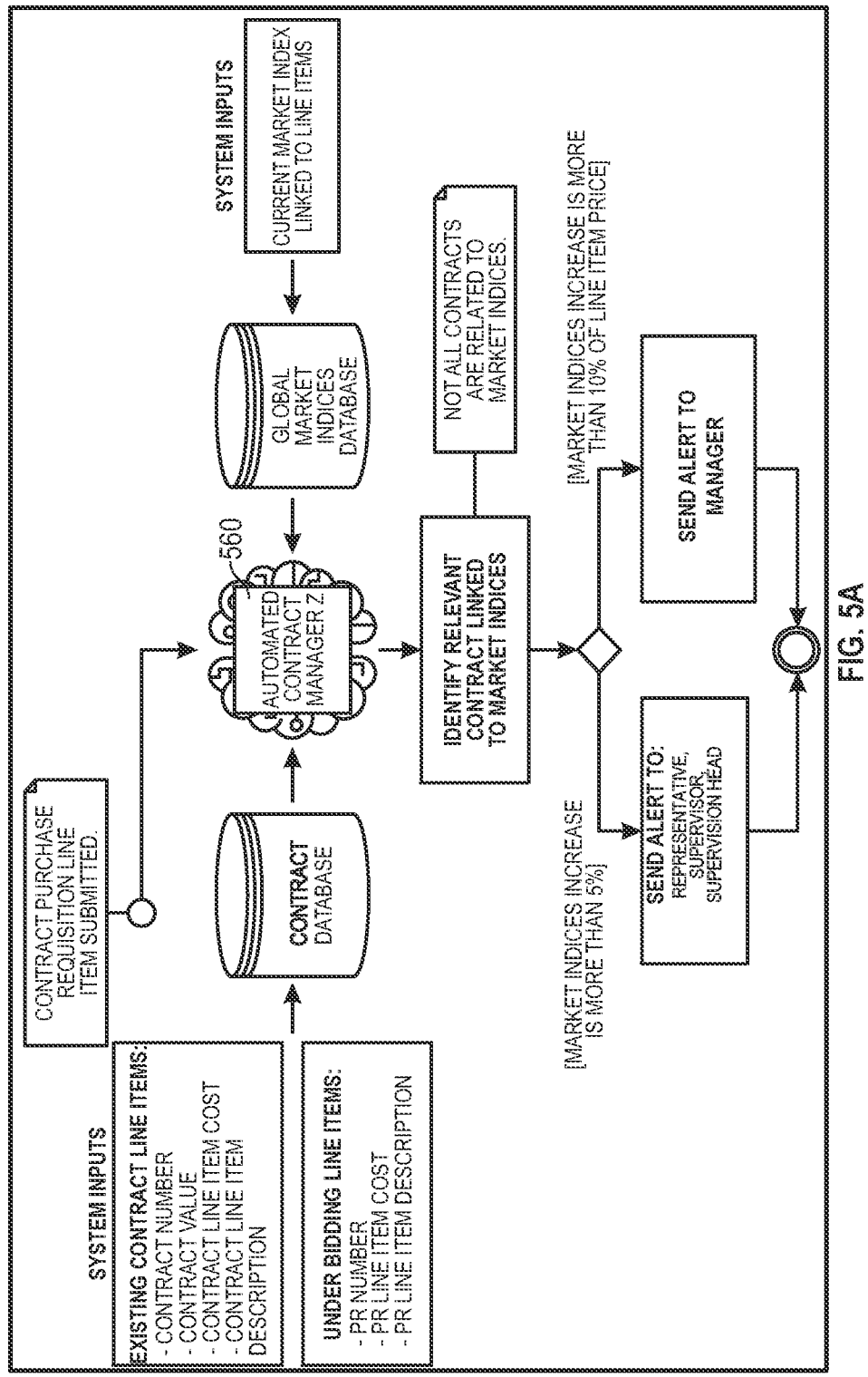
Figure 5B:
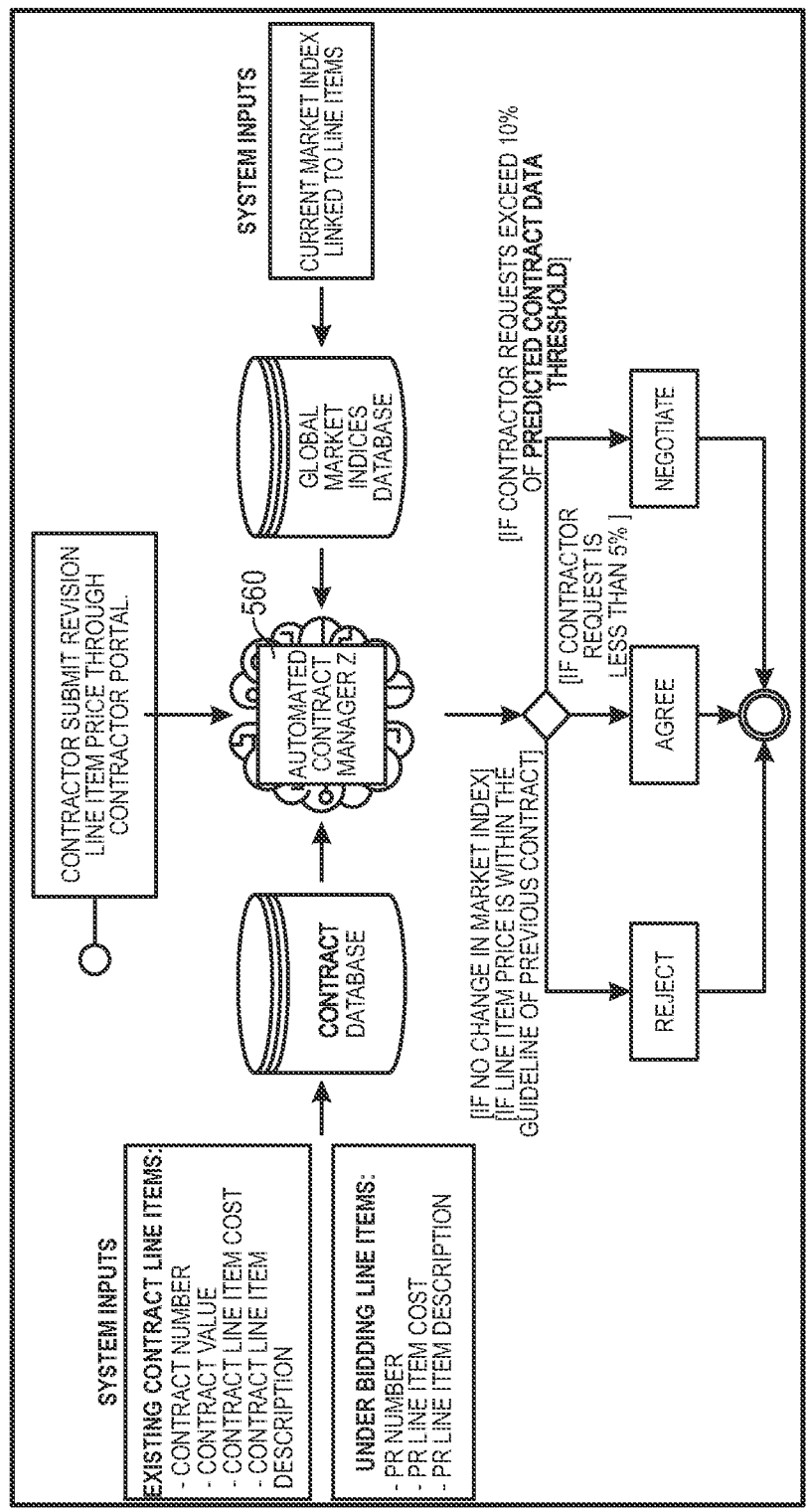
Figure 5C:
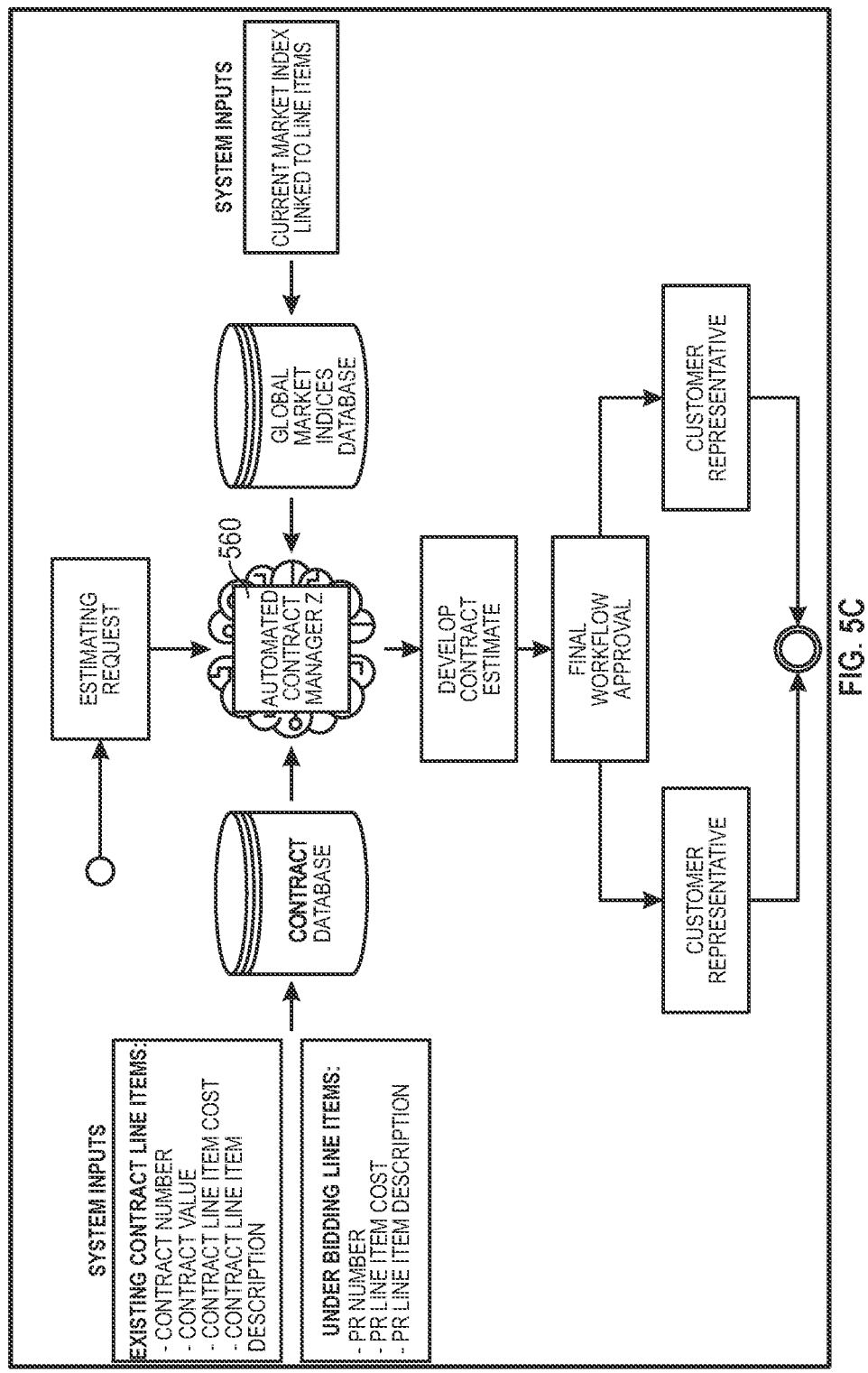

Turning to FIGS. 4, 5A, 5B, and 5C, FIGS. 4, 5A, 5B, and 5C provide examples of various automated contract manager determined predicted contract data in accordance with one or more embodiments. The following examples are for explanatory purposes only and not intended to limit the scope of the disclosed technology. In FIG. 4, an automated contract manager Y (460) receives a contractor's request to revise a bid or a contract's price. Using supply data from market indices and historical contract data, the automated contract manager Y (460) may determine whether to produce an alert to reject, revise, or negotiate a new contract. In FIGS. 5A, 5B, 5C, an automated contract manager Z (560) receives various requests from various entities on a contract management network. In FIG. 5A, an automated contract manager Z (560) receives a contract request for a contract purchase requestion line item, and the automated contract manager Z (560) performs a corresponding machine-learning workflow based on the request. In FIG. 5B, the automated contract manager Z (560) receives a contract request for a revision to a line item through a contractor portal and the automated contract manager Z (560) performs a corresponding machine-learning workflow based on the request. In FIG. 5C, the automated contract manager Z (560) receives a contract request for cost estimate of a prospective bid, and the automated contract manager Z (560) performs a corresponding machine-learning workflow based on the request.

Distributed Ledger Technology

In some embodiments, intermediary nodes are implemented using one or more types of distributed ledger technology. Examples of distributed ledger technology may include blockchains, hashgraphs, directed acyclic graphs, and various hybrid implementations of different distributed ledger technologies. In particular, a distributed ledger may be implemented using multiple nodes over a network, where an intermediary node protocol may determine which entities (e.g., any person or only approved entities) can operate nodes to validate transactions. Different distributed ledger technologies may also vary used different consensus algorithms, such as a proof of work, a proof of stake, a voting system, and/or hashgraphs. Thus, a distributed ledger technology may ensure that changes to a particular ledger are reflected throughout an intermediary node network, (e.g., all network members may have a matching copy of the whole ledger at any specific instance). Furthermore, a distributed ledger system may provide the ability for storing, recording, and exchanging of digital information across different, consenting parties without the need for a centralized authority or record-keeper.

In some embodiments, an intermediary node network may use a permissioned or a permissionless protocol. A permissioned protocol may use a form of permission among nodes for a central entity to access the intermediary node network, such as for modifying the distributed ledger. On the other hand, in the case of permissionless distributed ledgers, every node in an intermediary node network may access a full and updated copy of the entire ledger. In a hybrid distributed ledger technology (DLT), an intermediary node protocol may use features based on both permissionless and permissioned protocols.

Turning to hashgraph technology, a hashgraph may store multiple transactions on a distributed ledger using timestamps. A hashgraph record in a distributed ledger may be referred to as an "event", and transactions are stored in a parallel structure. The hashgraph system may ensures that no nodes on the intermediary node network may modify transaction information. Turning to directed acyclic graphs (DAGs), a DAG uses a consensus mechanism, where every node on the network provides a proof of transactions on the ledger and may initiate transactions. To initiate a transaction, a node has to verify at least two previous transactions on the ledger to confirm their new transaction.

Turning to blockchain technology, a blockchain network may be a peer-to-peer network that adheres to protocols for inter-node communication and validation of new blocks. For example, a blockchain network may allow two or more participants unknown to each other to perform transactions accordingly. In particular, blocks within a blockchain may be encrypted and protected by a hash function. When a new blockchain is being mined, a blockchain may be synchronized with other nodes in the blockchain network. By being decentralized, compromising the blockchain may requires cooperation with a majority of the blockchain nodes, thereby reducing the chance for fraudulent transactions. Transactions on a blockchain may transfer information between various public keys. Some blockchain technologies may implement a public blockchain network or a private blockchain network. A public blockchain network may not store information in a single place, but may distribute stored information across a peer-to-peer network. The public blockchain network may then use a verification mechanism to determine the authenticity of data. For example, a consensus method may be used where blockchain nodes reach an agreement on a current state of the distributed ledger. Examples of consensus methods include a proof of work (PoW) mechanism and a proof of stake (POS) mechanism. Turning to private blockchain networks, a private blockchain network may implement a closed network that is under the control of one or more entities. For example, a private blockchain network may operates similar to a public blockchain network (e.g., using peer-to-peer connections and decentralized storage). However, the private blockchain network may limit which nodes may join the network. Thus, a private blockchain network may use a permissioned protocol for adding new nodes accordingly.

Furthermore, a hybrid blockchain technology may combine elements of both private and public blockchain network. For example, a hybrid blockchain network may have a private, permission-based system alongside a public permissionless system. For example, a hybrid blockchain network may include functionality for controlling which data is only accessible to specific users in the blockchain, and which data is publically available. For example, transactions and records in a hybrid blockchain may not be made public but may be verified when requested, such as by allowing access through a smart contract. Confidential information may be kept inside the network while still allowing verification of the confidential information. Likewise, a hybrid blockchain technology may also prevent a private entity that owns the hybrid blockchain network from altering transactions.

Another blockchain technology is consortium blockchains (also called "federated blockchains"). A consortium blockchain is similar to a hybrid blockchain that has private and public blockchain features. However, members from multiple entities may collaborate on an intermediary network. Thus, a consortium blockchain may be a private blockchain with limited access to different groups, e.g., to avoid a single entity from exerting control over the private blockchain network. For example, consensus procedures may be controlled by preset nodes, such as a validator node and member nodes. The validator node may initiate, receive and validate transactions, while member nodes may receive or initiate transactions.

In some embodiments, a distributed ledger technology includes a mainchain for implementing the distributed ledger. However, some embodiments are contemplated that use a separate chain for each application, where individual chains may validate respective transactions on the mainchain after a particular epoch time/number of transactions.

Computer System

Figure 6:
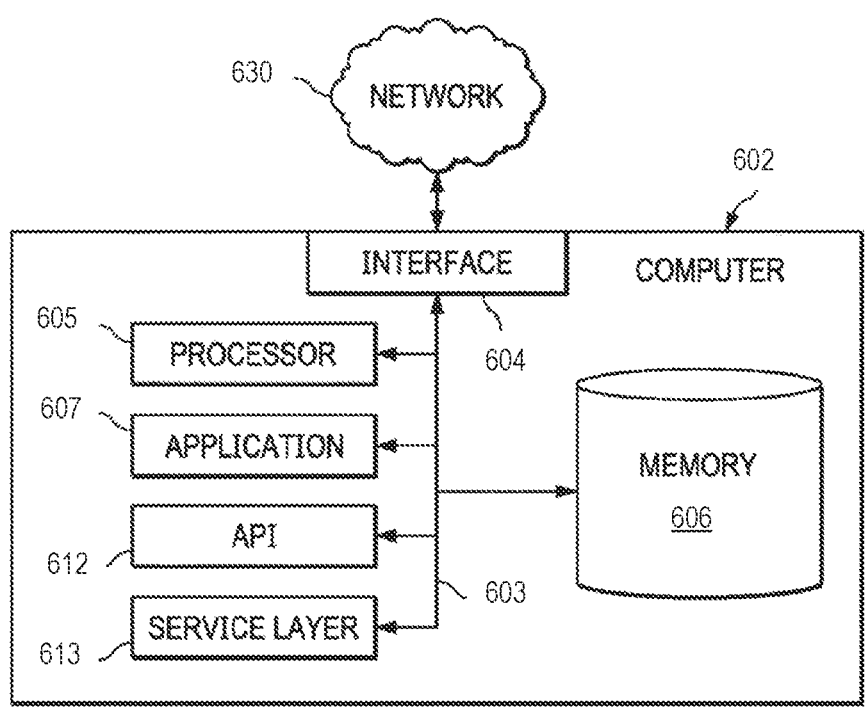
FIG. 6 shows a computer system in accordance with one or more embodiments.

Embodiments may be implemented on a computer system. FIG. 6 is a block diagram of a computer system (602) used to provide computational functionalities associated with described algorithms, methods, functions, processes, flows, and procedures as described in the instant disclosure, according to an implementation. The illustrated computer (602) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

In some embodiments, the computer (602) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
obtaining first historical contract data regarding a plurality of contracts for a plurality of service operations;
extracting, by a computer processor and from a plurality of servers, first supply data regarding a plurality of material components using a web scraping process,
   wherein the first supply data comprises chemical component price data, hot-rolled coil (HRC) steel data, and ocean freight data;
identifying, by the computer processor, a first contract among the plurality of contracts that is associated with a first service operation,
   wherein the first service operation is performed using at least one material component among the plurality of material components;
determining, by the computer processor, first predicted contract data for the first contract using a first machine-learning model, the first supply data, and the first historical contract data,
   wherein the first machine-learning model is trained using a machine-learning algorithm and a training dataset;
determining, by the computer processor, whether the first predicted contract data satisfies a predetermined criterion;
determining, by the computer processor and in response to the predicted contract data failing to satisfy the predetermined criterion, a first contract adjustment based on the first predicted contract data; and
transmitting, by the computer processor, a first command that adjusts the first contract based on the first contract adjustment.

2. The method of claim 1, further comprising:
transmitting, using at least one application programmable interface (API), a plurality of API calls to the plurality of servers, and
wherein the web scraping process extracts the first supply data from the plurality of servers in response to transmitting the plurality of API calls.

3. The method of claim 1,
wherein the web scraping process automatically extracts the first supply data using a plurality of automated scraper bots, and
wherein the plurality of automated scraper bots obtain the first supply data using a headless browser.

4. The method of claim 1,
wherein the first command is transmitted to a plurality of intermediary nodes that implement a distributed ledger comprising a smart contract,
wherein the smart contract automatically changes one or more contract terms of the first contract based on the first contract adjustment, and
wherein the plurality of intermediary nodes receive an acknowledgment message indicating acceptance of the first contract adjustment.

5. The method of claim 4,
wherein the plurality of intermediary nodes are blockchain nodes.

6. The method of claim 1, further comprising:
determining second predicted contract data for an electronic bidding process using a second machine-learning model, second supply data, and second contract data;
determining whether the second predicted contract data satisfies the predetermined criterion; and determining, in response to the second predicted contract data failing to satisfy the predetermined criterion, a second contract adjustment based on the second predicted contract data,
wherein the second contract adjustment changes one or more contract terms in the electronic bidding process.

7. The method of claim 1, further comprising:
determining a training dataset comprising labeled contract data, labeled supply data, and labeled cost data; and
performing a training operation of a second machine-learning model for predicting material cost data using the training dataset and the machine-learning algorithm,
wherein the second machine-learning model is updated iteratively using a plurality of machine-learning epochs until a predetermined level of accuracy is satisfied for predicting the material cost data.

8. The method of claim 1,
wherein the first machine-learning model is an artificial neural network comprising an input layer, a plurality of hidden layers, and an output layer, and
wherein the machine-learning algorithm is a backpropagation algorithm.

9. The method of claim 1,
wherein the predetermined criterion is a cost threshold corresponding to a predetermined difference between an initial cost estimate of the first contract and a predicted cost estimate of the first contract based on the first predicted contract data.

10. The method of claim 1, further comprising:
transmitting a second command to a control system coupled to a drill string at a well site,
wherein the first service operation comprises a drilling operation at the well site that is performed using the control system and the drill string, and
wherein the second command is configured to adjust one or more drilling parameters of the drilling operation based on the first contract adjustment.

11. A system, comprising:
a first server configured to store first supply data;
a plurality of intermediary nodes configured to store a smart contract using a distributed ledger technology; and
an automated contract manager comprising a computer processor, wherein the automated contract manager is coupled to the first server and the plurality of intermediary nodes, the automated contract manager being configured to perform a method comprising:
obtaining first historical contract data regarding a plurality of contracts for a plurality of service operations;
extracting, from the first server, first supply data regarding a plurality of material components using a web scraping process,
wherein the first supply data comprises chemical component price data, hot-rolled coil steel data, and ocean freight data;
identifying a first contract among the plurality of contracts that is associated with a first service operation among the plurality of service operations,
wherein the first service operation is performed using at least one material component among the plurality of material components;
determining first predicted contract data for the first contract using a first machine-learning model, the first supply data, and the first historical contract data,
wherein the first machine-learning model is trained using a machine-learning algorithm and a training dataset;
determining whether the first predicted contract data satisfies a predetermined criterion;
determining, in response to the first predicted contract data failing to satisfy the predetermined criterion, a first contract adjustment based on the first predicted contract data; and
transmitting, to the plurality of intermediary nodes, a first command that adjusts the first contract based on the first contract adjustment,
wherein the first contract is stored in the smart contract among the plurality of intermediary nodes.

12. The system of claim 11, wherein the method further comprises:
transmitting, using at least one application programmable interface (API), a plurality of API calls to a plurality of servers, and
wherein the web scraping process extracts second supply data from the plurality of servers in response to transmitting the plurality of API calls.

13. The system of claim 11,
wherein the web scraping process automatically extracts the first supply data using a plurality of automated scraper bots, and
wherein the plurality of automated scraper bots obtain the first supply data using a headless browser.

14. The system of claim 11,
wherein the first command is transmitted to the plurality of intermediary nodes over a computer network,
wherein the smart contract automatically changes one or more contract terms of the first contract based on the first contract adjustment, and
wherein the plurality of intermediary nodes receive an acknowledgment message indicating acceptance of the first contract adjustment.

15. The system of claim 11, wherein the method further comprises:
determining second predicted contract data for an electronic bidding process using a second machine-learning model, second supply data, and second contract data;
determining whether the second predicted contract data satisfies the predetermined criterion; and
determining, in response to the second predicted contract data failing to satisfy the predetermined criterion, a second contract adjustment based on the second predicted contract data,
wherein the second contract adjustment changes one or more contract terms in the electronic bidding process.

16. The system of claim 11, wherein the method further comprises:
determining a training dataset comprising labeled contract data, labeled supply data, and labeled cost data; and
performing a training operation of a second machine-learning model for predicting material cost data using the training dataset and the machine-learning algorithm,
wherein the second machine-learning model is updated iteratively using a plurality of machine-learning epochs until a predetermined level of accuracy is satisfied for predicting the material cost data.

17. The system of claim 11,
wherein the first machine-learning model is an artificial neural network comprising an input layer, a plurality of hidden layers, and an output layer, and wherein the machine-learning algorithm is a backpropagation algorithm.

18. The system of claim 11,
wherein the predetermined criterion is a cost threshold corresponding to a predetermined difference between an initial cost estimate of the first contract and a predicted cost estimate of the first contract based on the first predicted contract data.

19. The system of claim 11, further comprising:
a control system coupled to a drill string at a well site,
wherein the first service operation comprises a drilling operation at the well site that is performed using the control system and the drill string, and
wherein the drilling operation is adjusted based on a second command that implements the first contract adjustment.

20. The system of claim 11,
wherein the plurality of intermediary nodes comprise at least one blockchain node.

* * * * *